Patented June 24, 1930

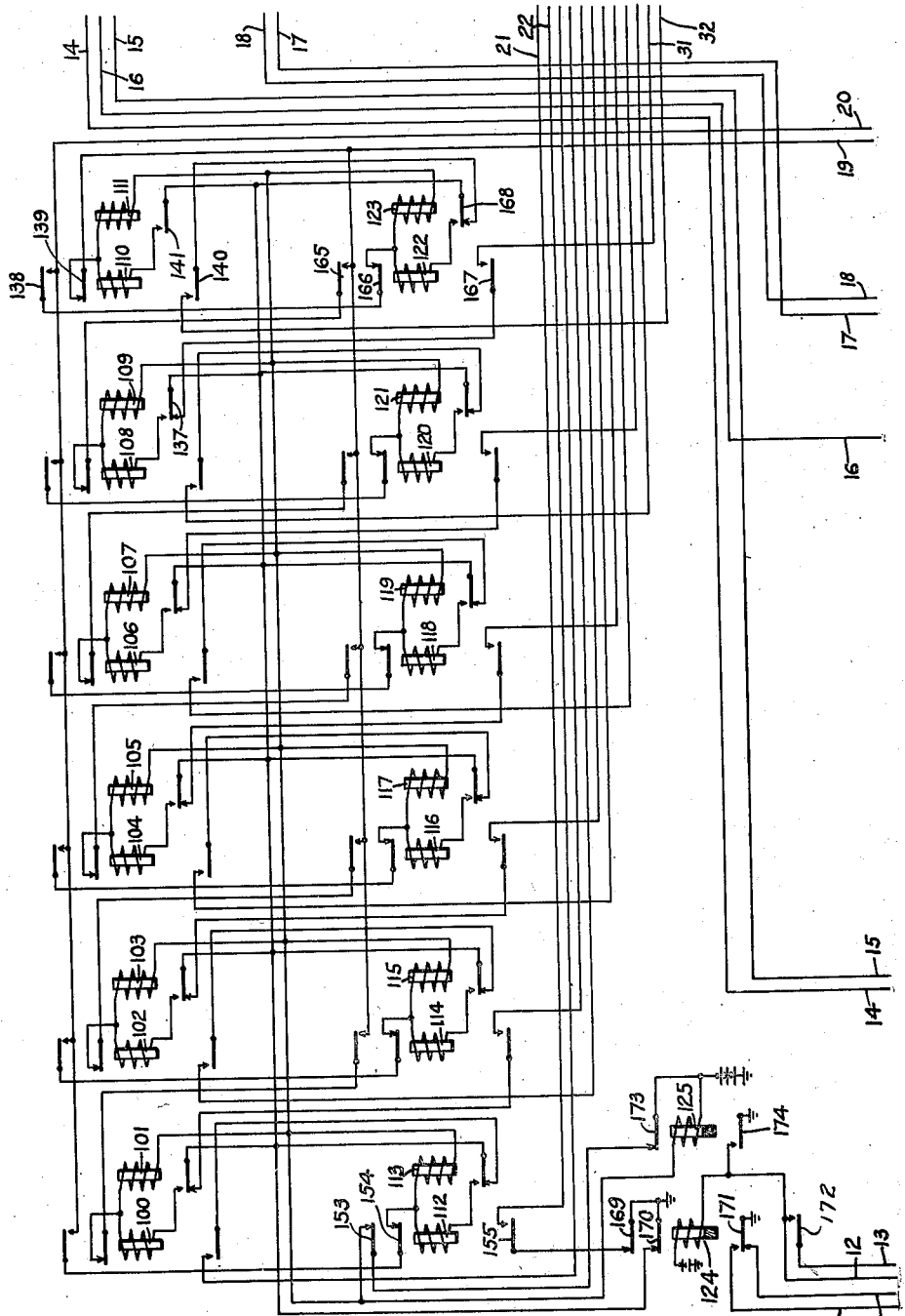
June 24, 1930.   T. U. WHITE ET AL   1,765,475
SIGNALING SYSTEM
Filed Nov. 15, 1924   8 Sheets-Sheet 1
INVENTORS
Thomas U. White &
John E. Gardner.
BY
ATTORNEY

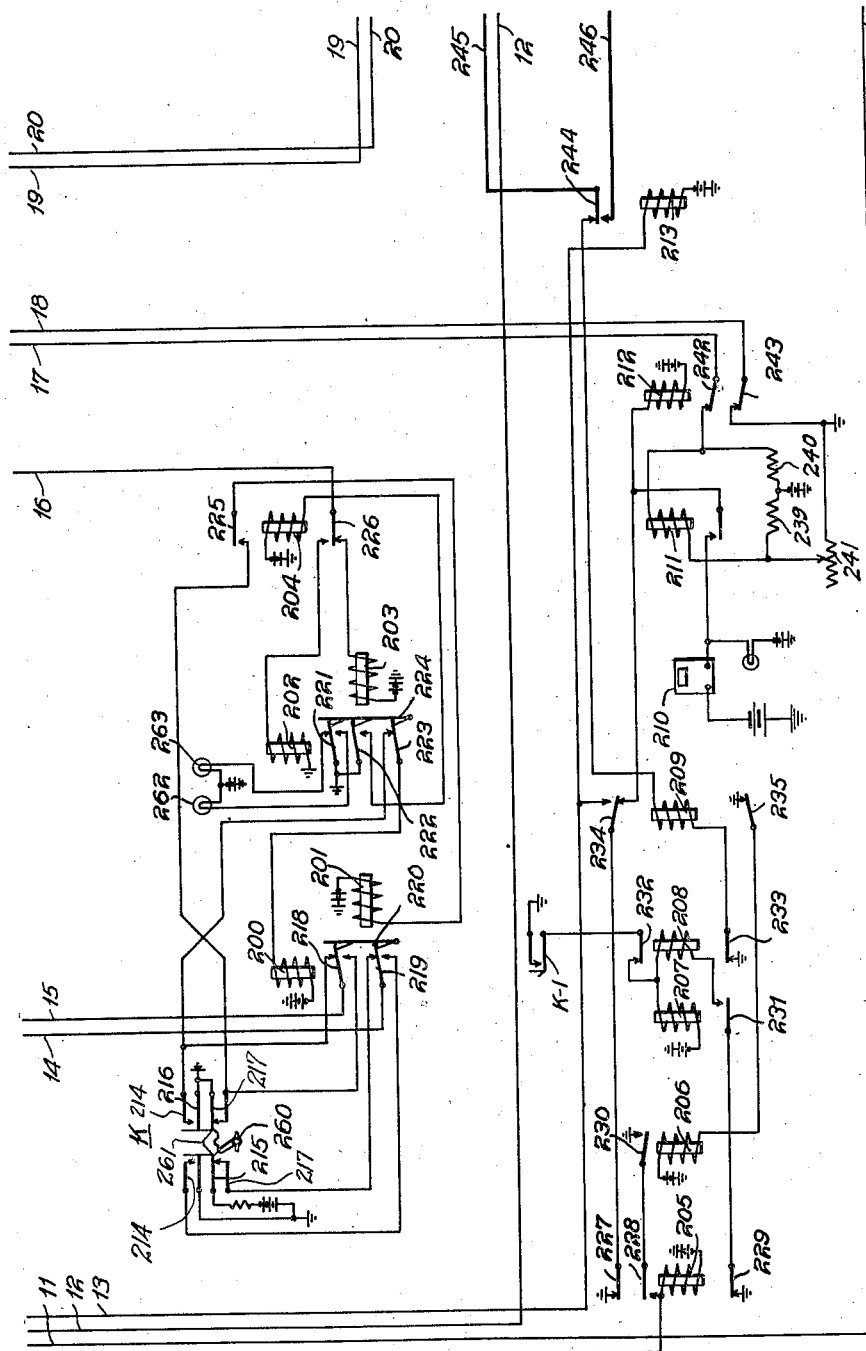

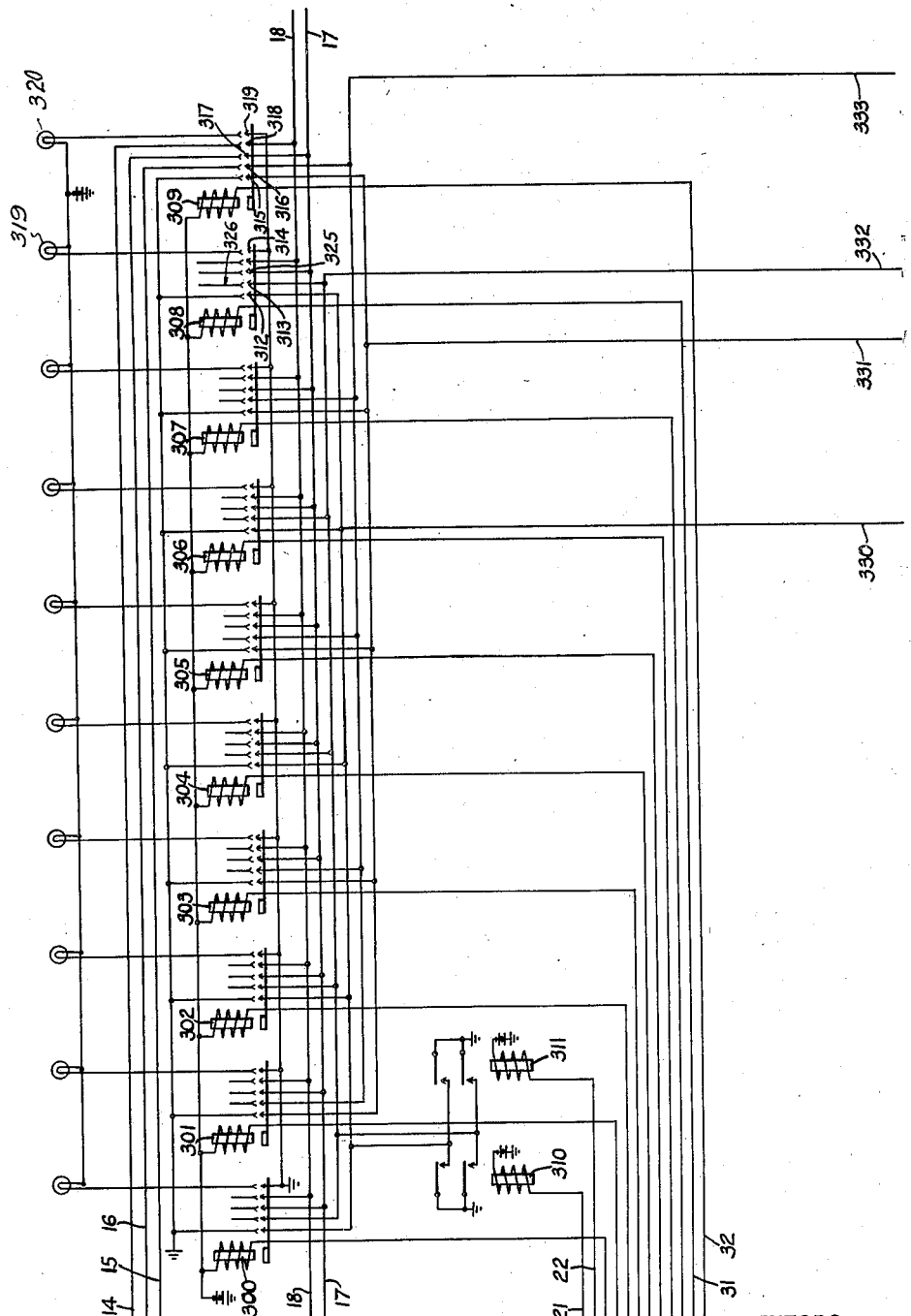

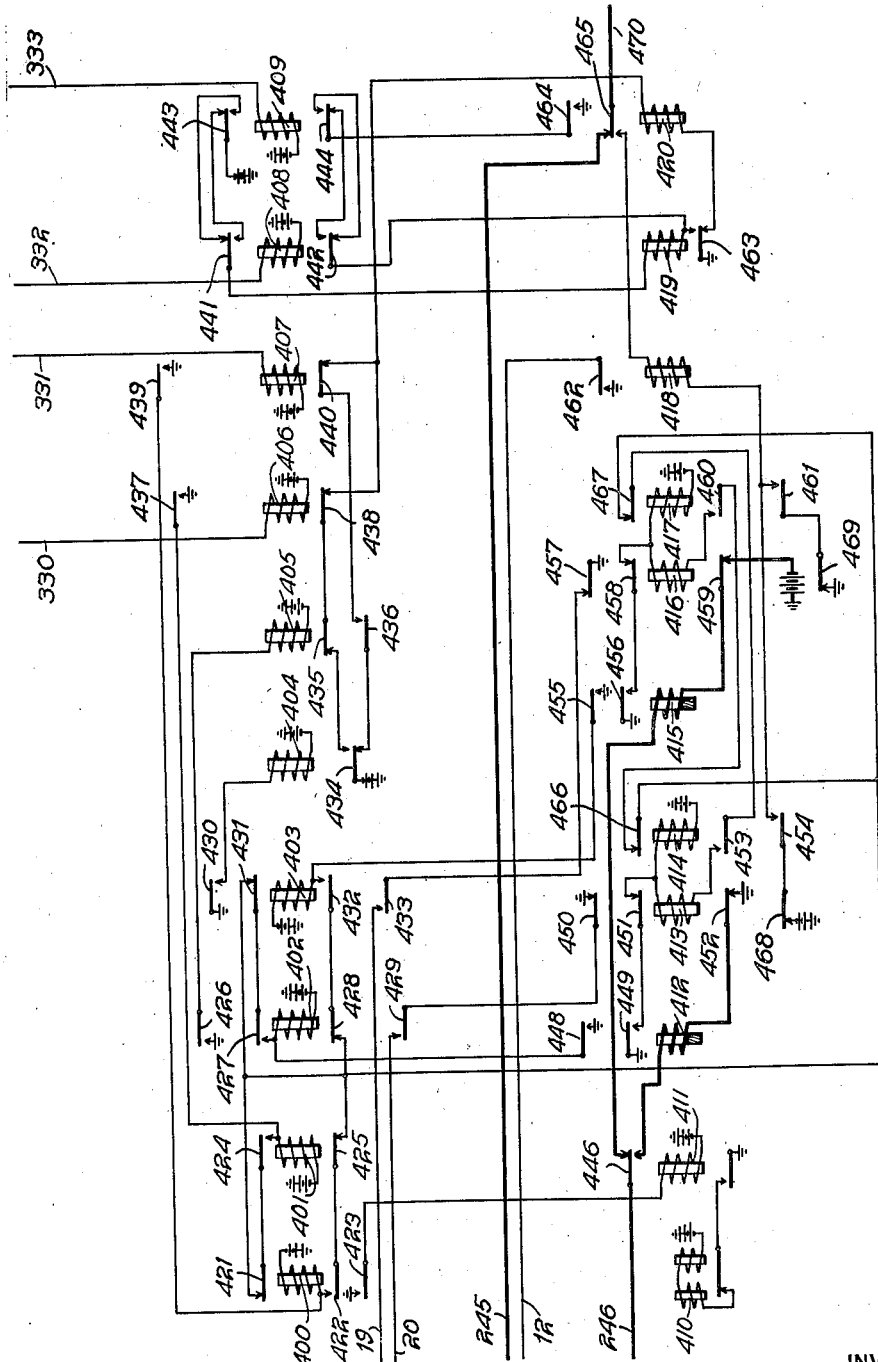

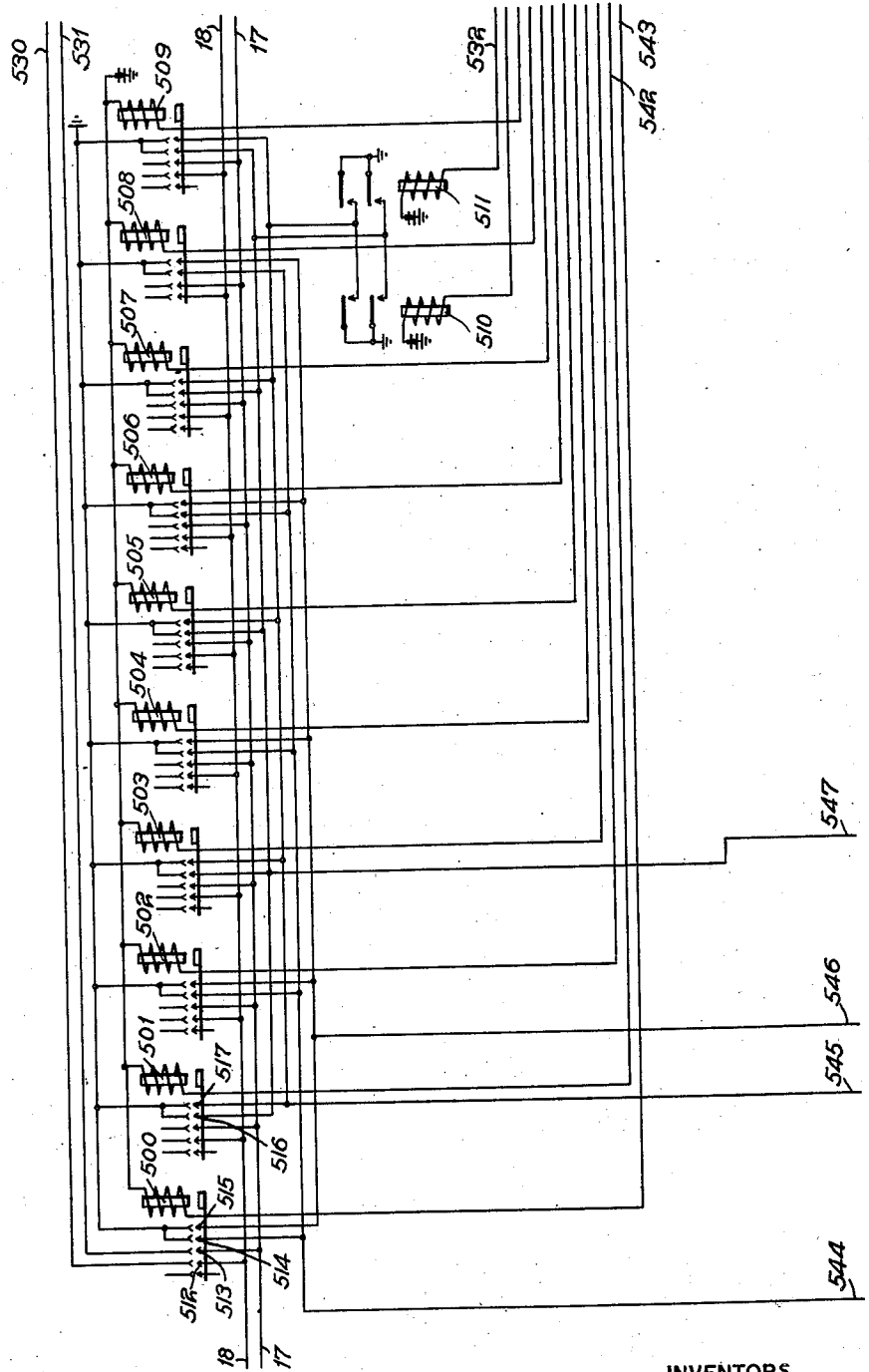

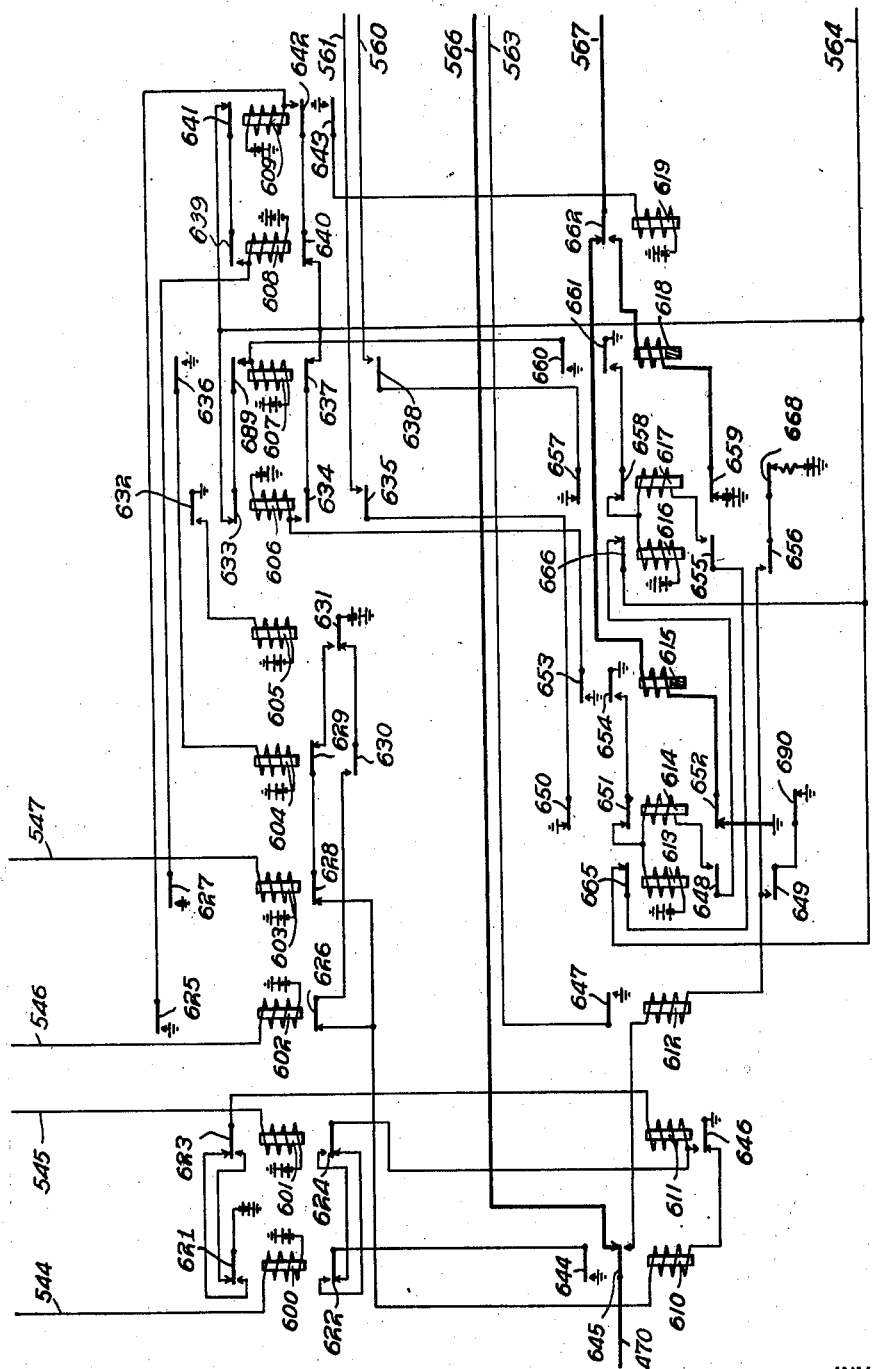

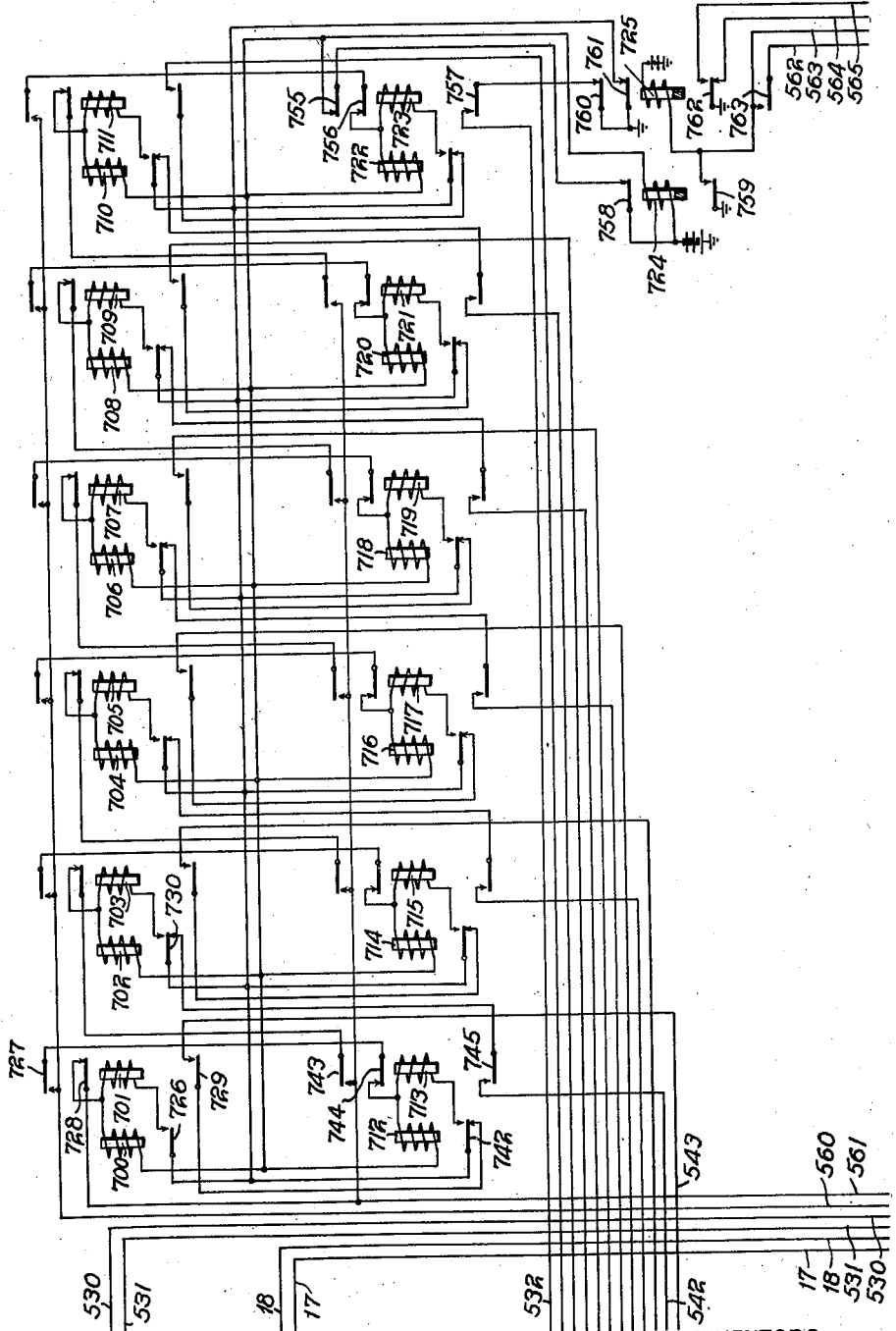

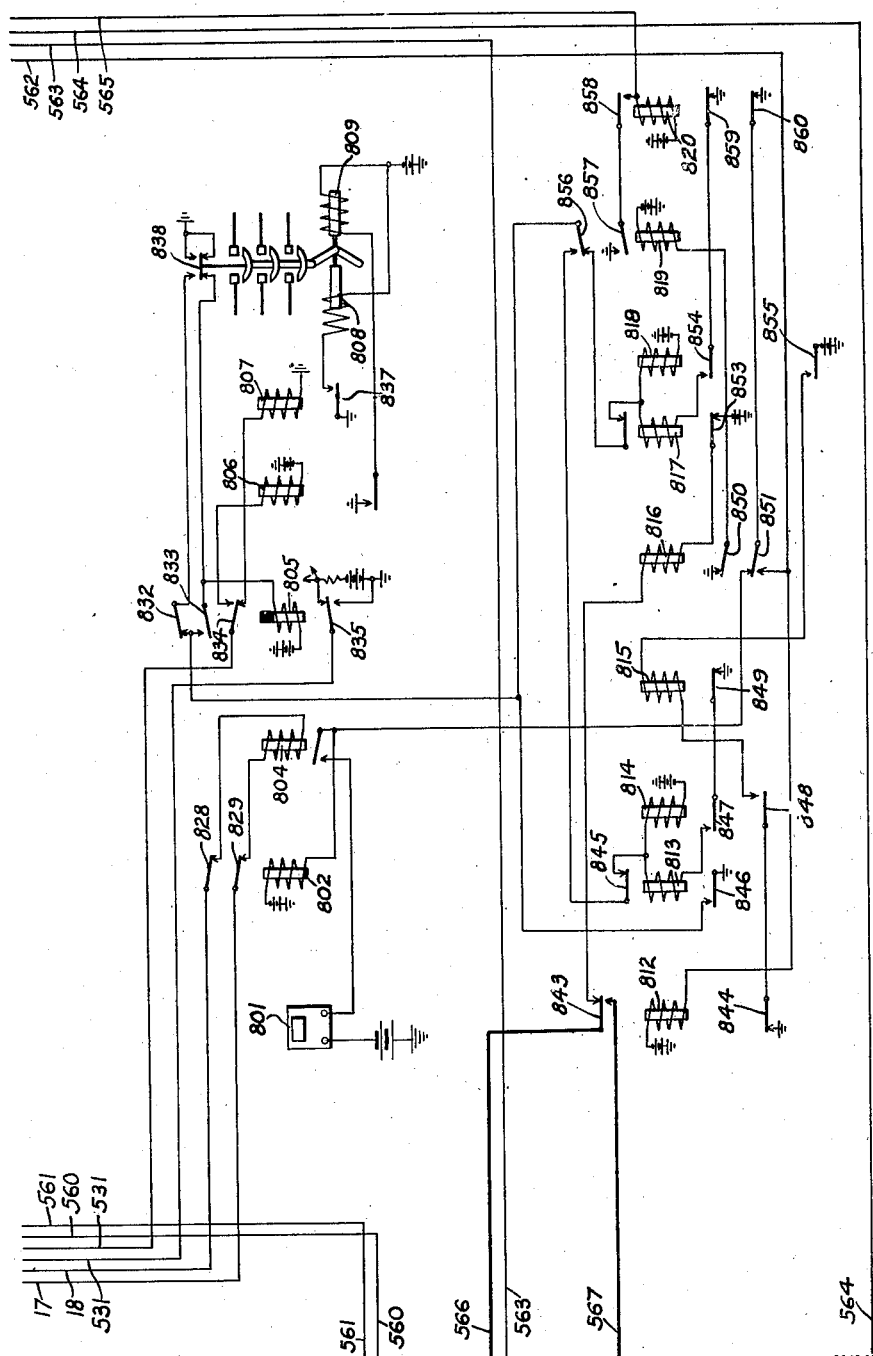

1,765,475

UNITED STATES PATENT OFFICE

THOMAS U. WHITE, OF PITTSBURGH, AND JOHN E. GARDNER, OF WILKINSBURG, PENNSYLVANIA, ASSIGNORS TO WESTINGHOUSE ELECTRIC & MANUFACTURING COMPANY, A CORPORATION OF PENNSYLVANIA

SIGNALING SYSTEM

Application filed November 15, 1924. Serial No. 750,068.

Our invention relates to signaling systems and more particularly to systems for supervising and controlling remotely-disposed electrical equipment from a central point or dispatcher's office.

One object of our invention is to provide a supervisory control system that shall have an improved synchronous control means for operating relay selecting devices at the dispatcher's office and at the substation or substations wherein is located the electrical equipment that it is desired to supervise and control.

Another object of our invention is to provide an automatic checking and releasing equipment in order that the relay selecting devices at the dispatcher's office and station may be automatically released in the event that there is an asynchronous action.

Another object of our invention is to provide testing means which will be operative in the event that any of the conductors that are used to connect the relay apparatus at the dispatcher's office and station together become inoperative, that is, the conductors may become open, short-circuited or grounded and the testing means will be effective.

A further object of our invention is to provide improved signaling circuits whereby the apparatus at the substation may be controlled and signals at the dispatcher's office operated in response to the operation of apparatus units in the station.

There are other objects of the invention which, together with the foregoing, will be described in the detailed specification which is to follow.

Referring now to the drawings, comprising Figures 1 to 8, inclusive, sufficient circuits and apparatus have been shown, by means of conventional diagrams, to enable our invention to be readily understood.

The apparatus and circuits shown in Figs. 1 to 4, inclusive, are those located at the dispatcher's office, while the apparatus and circuits shown in Figs. 5 to 8, inclusive, are those located at the station or substation.

In practicing our invention, we provide a group of counting relays at the dispatcher's office and a group of counting relays, corresponding in number, at the station in which are located the apparatus units that it is desired to control. There is one group of auxiliary selecting relays associated with each group of counting relays.

A control or driving circuit is located at both the dispatcher's office and station for operating the counting relays. The counting relay groups and control circuits are connected together by means of a three-conductor trunk line, a ground return being used. It is, of course, obvious that a separate conductor common to the other three may be used to eliminate difficulties that might be encountered by reason of varying ground potentials between the dispatcher's office and station.

At the dispatcher's office, a group of keys are provided, corresponding in number to the number of apparatus units that it is desired to operate. A starting key is also located at the office. In order that the dispatcher may be apprised of the condition of the apparatus units in the station, two signaling lamps are provided for each apparatus unit, one to indicate the operative condition of the unit and the other to indicate the inoperative condition of the unit.

When the dispatcher desires to control an apparatus unit at the station or substation, he will operate the key associated with that particular unit in the proper direction and also the start key. As a result of this operation, the driving circuits function to operate the relays in the counting groups in a predetermined sequence. By the operation of the driving circuit, corresponding relays in the counting groups are operated simultaneously. Thus, the relays of the counting groups operate in synchronism.

Simultaneously with the operation of the relays of the counting chain, the relays in the auxiliary selecting groups are operated in a predetermined sequence. That is, corresponding relays in the auxiliary group at the dispatcher's office and station, respectively, are energized simultaneously.

When the proper apparatus unit is selected, a circuit is closed from a source of direct current at the dispatcher's office over a signaling conductor to operate a relay at the substation. The operation of this relay closes a circuit for operating the apparatus unit. In the meantime, the driving circuit is prevented from operating and the relay selecting apparatus maintains connection with the selected apparatus unit.

When the apparatus unit operates, a circuit is closed from a source of direct current at the substation for operating the supervisory signaling devices at the dispatcher's office to indicate the operation of the unit. The driving circuit again starts to function. After all the relays in the auxiliary selecting groups are operated, the apparatus restores to normal.

In the event that an apparatus unit at the station operates under the control of automatic devices responsive to circuit conditions or is operated manually by an operator there, the operation of the selecting apparatus occurs in substantially the same manner as before described, and supervisory signaling devices, associated with the apparatus unit that has been operated, are controlled to give an indication showing the condition of the apparatus unit at the station.

Referring now more particularly to Fig. 1, relays 100 to 123, inclusive, comprise the group of counting relays at the dispatcher's office. Relays 124 and 125 are slow-acting relays of the usual type and control certain releasing operations.

In Fig. 2, a key K is a special double-throw key. There is one such key for each apparatus unit that it is desired to control. Keys, such as K, are so constructed that, when operated, they lock in a certain position. Thus, in order to force the springs 214 and 216 into engagement with their working contacts and the springs 215 and 217 out of engagement with their resting contacts, it is necessary to turn the operating member 260 to operate a member 261. The member 261 causes the operation of the springs. When the key is thrown in the opposite direction, the operating member 260 actuates the member 261 so as to permit the springs to restore to the position shown in the drawings.

By this construction, it will be seen that it is impossible for the dispatcher to inadvertently operate a key by leaning on the control-board, or by a key catching in any part of his clothing.

The key K—1 is of the ordinary single-throw non-locking type and is provided for starting the operation of the relay selecting apparatus. Relays 200 to 204, inclusive, are associated with each key, such as K, and signaling devices 262 and 263. The relays 200 and 201 have their armatures so mechanically interlocked that, when the relay 200 operates, its armatures 218 and 219 are latched in position by the armature 220 of the relay 201. When the relay 201 is energized, the armature 220 is operated and the armatures 218 and 219 of the relay 200 are permitted to be restored to their normal position. The detailed mechanical construction of this relay is fully described in copending application of R. J. Wensley, Serial 750,183, filed Nov. 15, 1924, Patent No. 1,695,907, Dec. 18, 1928. The relays 202 and 203 have their armatures similarly interlocked. Relays 205 to 213, inclusive, are of the usual type and constitute part of the driving or control circuit.

Relays 300 to 309, inclusive, Fig. 3, comprise the group of auxiliary selecting relays associated with the group of counting relays 100 to 123, inclusive. These relays are of well-known construction and are referred to as multi-contact relays. Relays 310 and 311 comprise a portion of the control circuit at the dispatcher's office. The lamps, such as 319 and 320, associated with each selecting relay, are provided for the purpose of informing the dispatcher of the selecting position of the relay apparatus.

In Figs. 4, relays 400 to 420, inclusive, comprise the remaining portion of the control circuit at the dispatcher's office.

In Fig. 5, relays 500 to 509, inclusive, comprise the group of auxiliary selecting relays at the substation. Relays 510 and 511 comprise a portion of the control circuit at the substation.

In Fig. 6, relays 600 to 619, inclusive, comprise another portion of the control circuit at the substation.

In Fig. 7, relays 700 to 723, inclusive, comprise the group of counting relays at the substation. Relays 724 and 725 are slow-acting relays and are provided for the purpose of controlling certain releasing operations.

In Fig. 8, relays 801, 802, 804 and 812 to 820, inclusive, comprise the remaining portion of the control circuit. Relays 805 to 807, inclusive, are associated with each apparatus unit, such as a circuit interrupter C. The circuit interrupter C, which has been shown as an apparatus unit, may be of any usual construction and may perform any desired function in the station. The relay 805 is a slow-acting relay, that is, the relay is constructed to be slightly slow to energize as well as slow to deenergize.

The apparatus shown in the drawings having been described in general, its detailed operation will now be explained. For this purpose, it will be assumed that the circuit interrupter C at the substation is in the position shown in the drawings and that the dispatcher desires to close this circuit interrupter. To accomplish this result, the dispatcher will operate the key K in the proper direction, it being assumed that this operation causes the springs 214 and 216 to be moved into the position shown in the drawings. The dispatcher will then momentarily depress the starting key K—1.

Normally, the holding relays 209 and 816 at the dispatcher's office and substation, respectively, are energized in series over a holding circuit that extends from ground by way of back contact and armature 233, holding relay 209, back contact and armature 244, conductor 245, back contact and armature 465, trunk conductor 470, armature 645 and its back contact, conductor 566, armature 843 and its back contact, relay 816 and armature 853 and its back contact to battery.

The holding relay 209, upon operating, completes a circuit at its armature 235 for the relay 206, and at armature 234 completes a circuit for the relay 212. The relay 206 is energized to open one point in the locking circuit of the relay 205 at armature 230. The relay 212 is energized to connect the Wheatstone bridge to the conductors 17 and 18 at armatures 242 and 243.

At the substation, the relay 816 is energized to complete a circuit for the relay 819 at armature 850 and to complete a circuit at armature 851 for the relay 802 and for the buzzer 801. The relay 802 is operated to complete the Wheatstone bridge testing circuit. The relay 819 is operated to prepare one point in the starting circuit at the armature 856 and to open one point in the locking circuit of the relay 820 at armature 857.

The testing circuit comprises a Wheatstone bridge which is made up of fixed resistors 239 and 240 comprising two arms of the bridge and the variable resistor 241 comprising the third arm of the bridge. The fourth arm of the bridge extends from the terminal of the resistor 240 by way of front contact and armature 242, conductor 17, armature 829 and its front contact, relay 804, front contact and armature 828, conductor 18, and armature 243 and its front contact to ground.

The Wheatstone bridge is balanced by varying the resistance of the variable resistor 241 so that the relay 211 is not energized. If there is an unbalance in the circuit of the fourth arm of the bridge comprising the two signaling conductors between the station and the dispatcher's office, current will traverse the relay 211 which will be operated to energize the buzzer 210 and to light a lamp 236. The variable resistor 241 is so adjusted that, normally, no current traverses the relay 211.

The relay 804 at the substation is energized over the testing circuit and operates to open the circuit of the buzzer 801.

In the event that either of the signaling conductors 18 or 17 becomes open, short-circuited or grounded, in the normal condition of the system, the relay 211 is energized. By this operation, the buzzer 210 is operated and the lamp 236 is lighted to indicate the trouble to the dispatcher. As a result of this fault at the substation, the relay 804 will be deenergized to close the circuit of the buzzer 801, thereby calling the attention of any person who may be at the substation to the difficulty.

When the key K—1 is depressed, as before described, there is a circuit completed that extends from ground by way of the springs of said key, armature 232 and its back contact and relay 207 to battery. The relay 207 is energized to complete a circuit extending from ground by way of back contact and armature 229, armature 231 and its front contact, relay 208 and relay 207 to battery. This circuit is not effective until the key K—1 is released by reason of the fact that the relay 208 is short-circuited by the original energizing circuit for the relay 207.

When the key K—1 is released, the short-circuit is removed from the relay 208 and this relay is permitted to energize to open one point in the original energizing circuit of the relay 207 at armature 232 and to open the holding circuit at armature 233 whereby the holding relays 209 and 816 at the dispatcher's office and substation, respectively, are deenergized.

The relay 209 is deenergized to open one point in the circuit of the relay 206 at armature 235, to open one point in the circuit of the relay 212 at armature 234, and to complete a circuit at the back contact of this armature that extends from ground by way of back contact and armature 227, armature 234 and its back contact and relay 213 to battery. The relay 206 is deenergized to complete one point in the locking circuit of the relay 205. The relay 212 is deenergized to open the Wheatstone bridge testing circuit. The relay 211 is, of course, energized, but this is without effect at the present time by reason of the fact that the relay 209 is deenergized. The relay 213, upon operating, opens one point in the holding circuit of the relay 209 at armature 244 and at the front contact of this armature prepares a circuit for the line relay 415.

At the substation, the relay 816, upon deenergizing, opens the circuit of the relay 819 at armature 850, opens the circuit of the relay 802 at armature 851, and completes a circuit at the back contact of this armature for the relay 812 over a path extending from ground by way of back contact and armature 860, armature 851 and its back contact and relay 812 to battery. The relay 819 is deenergized to prepare one point in the locking circuit of the relay 820 at armature 857 and to prepare another starting circuit at the armature 856 and its back contact. The relay 812 is energized and the relay 802 is deenergized to open the circuit of the relay 804. The relay 804 is deenergized to prepare one point in the circuit of the buzzer 801; however, this is ineffective at the present time by reason of the fact that the relay 816 is deenergized.

The relay 812, upon operating, opens another point in the circuit of the holding relay 816 at armature 843, and at the front contact of this armature prepares a circuit for the line relay 615.

The control or driving circuit is now completed over a path that extends from the negative pole of the battery B at the dispatcher's office by way of back contact and armature 459, slow-acting relay 415, back contact and armature 446, conductor 246, front contact and armature 244, conductor 245, back contact and armature 465, trunk conductor 470, armature 645 and its back contact, conductor 566, armature 843 and its front contact, conductor 567, armature 662 and its back contact, slow-acting line relay 615, and armature 652 and its back contact to ground. The line relays 415 and 615 are now energized in series.

The line relay 415 operates to complete a circuit at armature 456 for the relay 417, and at armature 455 completes a circuit for the relay 403. The relay 417, upon operating, completes one point in the circuit of the relay 418 at armature 461, and at armature 460 completes a circuit that may be traced from ground by way of armature 171 and its back contact, conductor 11, armature 466 and its back contact, armature 460 and its front contact, relay 416 and relay 417 to battery. The relay 416 is not energized at this time by reason of the fact that it is short-circuited so long as the original energizing circuit for the relay 417 is maintained.

The relay 403, upon being operated, establishes a locking circuit for itself at armature 432, completes an impulsing circuit at armature 433, opens one point in the locking circuit of the relay 402 at armature 431, and at armature 430 completes a circuit for the relay 404. The locking circuit of the relay 403 extends from ground upon grounded conductor 11 by way of back contact and armature 428, armature 432 and its front contact and relay 403 to battery. The relay 404, upon being energized, completes a circuit that extends from battery by way of armature 434 and its front contact, back contact and armature 435, armature 438 and its back contact, relay 420 and back contact and armature 463 to ground.

The previously mentioned impulsing circuit extends from ground by way of armature 457 and its back contact, armature 433 and its front contact, conductor 19, armature 139 and its back contact, relay 111, back contact and armature 153, and back contact and armature 173 to battery.

The counting relay 111 is energized over the above circuit and operates, at armature 141, to complete a circuit that extends from ground by way of armature 170 and its back contact, armature 141 and its front contact, relay 110, relay 111, back contact and armature 153, and back contact and armature 173 to battery. The relay 110 is not energized so long as the original energizing circuit of the relay 111 is maintained.

The relay 420 is energized over a previously traced circuit and operates to prepare a circuit for the relay 419 at armature 464, to open the circuit of the line relay 415 at armature 465, and to prepare a point in the circuit of the relay 418 at the front contact of this armature. The line relay 415 is deenergized after a short interval of time to open the original energizing circuit of the relay 417, thereby removing the short-circuit from the relay 416 and permitting this relay to energize. The relay 416 operates to open another point in the circuit of the relay 415 at armature 459, to open another point in the original energizing circuit of the relay 417 at armature 458, to open one point in the circuit of the relay 418 at armature 469, and to open the original energizing circuit of the counting relay 111 at armature 457.

The latter operation removes the short-circuit from the relay 110 and this relay operates to prepare a circuit for the counting relay 123 at armature 138, to open another point in the original energizing circuit of the relay 111 at armature 139, and to complete a circuit at armature 140 extending from ground by way of back contact and armature 170, armature 168 and its back contact, armature 140 and its front contact, conductor 32 and selecting relay 309 to battery. The first selecting relay 309 is energized to complete a circuit for the lamp 320 at spring 319 and to prepare certain signaling circuits at springs 316 to 318, inclusive.

Another result of the operation of the relay 309 is that, at spring 315, a circuit is completed that extends from ground by way of working contact and said spring, conductor 331 and relay 407 to battery. The operation of the relay 407 serves to open one point in the circuit of the relay 420 at armature 440, and to complete a circuit at armature 439 for the relay 400. The relay 400 is energized to prepare a locking circuit for itself at armature 422 to ground upon grounded conductor 11, to open one point in the locking circuit of the relay 401 at armature 421, and to complete a circuit at armature 423 for the relay 411. The relay 411 is energized to open another point in the circuit of the line relay 415 and to prepare a circuit for the line relay 412. Another result of the operation of the relay 411 is that the circuit of the buzzer 410 is closed and this buzzer immediately begins to operate. The function of this buzzer is to inform the dispatcher that the selecting action is taking place. The lighting of the lamp 320 apprises the dispatcher of the selecting position of the apparatus.

At the station, the line relay 615 operates to complete a circuit for the relay 613 at armature 654 and to complete a circuit for the relay 606 at armature 653. The relay 613 is energized to open one point in the locking circuit of the relays 616 and 617 at armature 665, to connect ground between the terminals of the winding of the relay 612 at armature 649, and to complete a circuit that extends from ground by way of armature 762 and its back contact, conductor 564, armature 666 and its back contact, armature 648 and its front contact, relay 614 and relay 613 to battery. This circuit is not effective so long as the original energizing circuit of the relay 613 is maintained.

The relay 606, upon being energized, completes a circuit at armature 632 for the relay 605, opens another point in the locking circuit of the relay 607 at armature 633, completes a locking circuit for itself at armature 634, and at armature 635 completes an impulsing circuit. The locking circuit for the relay 606 extends from ground upon grounded conductor 564 by way of back contact and armature 637, armature 634 and its front contact, and relay 606 to battery.

The relay 605, upon being energized, completes a circuit extending from battery by way of armature 631 and its front contact, back contact and armature 629, armature 628 and its back contact, relay 610 and back contact and armature 646 to battery.

The previously mentioned impulsing circuit extends from ground by way of back contact and armature 650, armature 635 and its front contact, conductor 561, armature 728 and its back contact, counting relay 700, back contact and armature 755, and back contact and armature 758 to battery.

The counting relay 700 is energized over the above-traced circuit to complete a circuit extending from ground by way of armature 761 and its back contact, armature 726 and its front contact, relay 701, relay 700, back contact and armature 755 and back contact and armature 758 to battery. The relay 701 is not energized until the original circuit for the relay 700 is opened.

The relay 610 is energized over the previously traced circuit and operates to prepare one point in the circuit of the relay 611 at armature 644, to open the circuit of the line relay 615 at armature 645 and to complete a testing circuit at the front contact of this armature. The line relay 615 is deenergized after a short interval of time to remove the short-circuit from the winding of the relay 614. The relay 614 is immediately operated to open another point in the circuit of the relay 615 at armature 652, to open the circuit of the relay 613 at armature 651, to remove the short-circuit from the winding of the counting relay 701 at armature 650, and to open one point in the testing circuit at armature 690.

The counting relay 701 is immediately energized to prepare a circuit for the counting relay 712 at armature 727, to open another point in the original energizing circuit of the relay 700 at armature 728 and to complete a circuit at armature 729 that extends from ground by way of armature 761 and its back contact, armature 742 and its back contact, armature 729 and its front contact, conductor 543 and selecting relay 500 to battery.

The selecting relay 500 is energized to prepare certain signaling circuits at springs 512 and 513 and to place ground upon the conductors 544 and 546 at springs 514 and 515, respectively. The grounding of conductor 544 brings about the energization of the relay 600. The grounding of conductor 546 brings about the operation of the relay 602.

The testing circuit mentioned above extends from ground by way of armature 469 and its back contact, armature 461 and its front contact, testing relay 418, front contact and armature 465, trunk conductor 470, armature 645 and its front contact, testing relay 612, front contact and armature 649, and armature 690 and its back contact to ground. This circuit is not effective by reason of the fact that it extends from ground to ground. However, should there be any false operation of the relays, either through contact failure or otherwise, so that the apparatus at the substation and dispatcher's office does not operate synchronously, this testing circuit will be effective in a manner which will be described hereinafter.

The relay 602, upon being operated, completes a circuit for the relay 609 at armature 625, and at armature 626 opens one point in the circuit of the relay 610. The relay 609, upon being energized, opens one point in the locking circuit of the relay 608 at armature 641, prepares a locking circuit for itself at armature 642, and at armature 643 completes a circuit for the relay 619. The relay 608 is deenergized to establish a locking circuit for the relay 609. The relay 619 is energized to prepare one point in the circuit of the line relay 618 at armature 662.

The relay 600, upon being energized, completes a circuit that extends from ground by way of front contact and armature 644, armature 622 and its front contact, back contact and armature 624, relay 611, armature 623 and its back contact, and front contact and armature 621 to battery. The relay 611 is energized to establish a locking circuit for itself at armature 646, exclusive of the armature 644, and to open the circuit of the relay 610 at the back contact of this armature. The relay 610 is immediately deenergized to complete another point in the circuit of the relay 618.

A signaling circuit is now completed that extends from battery by way of spring 215 and its resting contact of key K, front contact and armature 219, conductor 14, working contact of spring 318 and said spring, conductor 18, spring 512 and its working contact, conductor 530, armature 834 and its front contact and relay 807 to ground.

The relay 807 is energized over the above-traced circuit and it operates to complete a circuit for the closing coil 808 of the circuit breaker C at armature 837. The circuit breaker C is operated to its closed position. This operation causes the pallet switch 838 to assume a position in engagement with its working contacts with the result that the circuit of the slow-acting relay 805 is opened.

Another result of the operation of the pallet switch 838 is that a circuit is completed extending from ground by way of said pallet switch, armature 832 and its front contact, armature 856 and its back contact, armature 845 and its back contact and relay 814 to battery.

The relay 814 is energized to complete a circuit that extends from ground by way of back contact and armature 849, armature 847 and its front contact, relay 813 and relay 814 to battery. This circuit is not effective until the original energizing circuit of the relay 814 is opened to energize the relay 813.

Another result of the operation of the relay 814 is that a circuit is prepared for the relay 815 at armature 848. When the slow-acting relay 805 is deenergized, the original energizing circuit of the relay 814 is opened and the relay 813 is permitted to energize. The relay 813 operates to open another point in the circuit of the relay 814 and to place ground upon the armature 856 at armature 846. The deenergization of the relay 805 also opens the circuit of the relay 807. The relay 807 is deenergized to open the circuit of the closing coil 808 of the circuit breaker C.

An additional result of the operation of the slow-acting relay 805 is that a signaling circuit is completed that extends from ground by way of back contact and armature 835, conductor 531, working contact of spring 513 and said spring, conductor 17, spring 317 and its working contact, conductor 16, armature 226 and its back contact and relay 203 to battery.

The relay 203 is energized to operate the armature 224, thereby permitting the armatures 221, 222 and 223 to restore to normal. As a result of the operation of the armature 221, the signaling device 263 is extinguished and the signaling device 262 is illuminated. This change in supervisory signals apprises the dispatcher of the action of the circuit interrupter C at the substation. The operation of the armature 222 completes a circuit for the relay 204, while the operation of the armature 223 opens another point in the circuit of the relay 200.

The relay 204 is energized to open the circuit of the relay 203 at armature 226, to prepare a circuit for the relay 202 at the front contact of this armature, and to complete a circuit extending from ground by way of resting contact of spring 217 and said spring, front contact and armature 225 and relay 201 to battery. The relay 201 is energized to attract the armature 220, thereby permitting the armatures 218 and 219 to be restored to normal position.

By the operation of the armature 219, another point in the signaling circuit is opened. By the operation of the armature 218, a circuit is completed that extends from ground by way of spring 217 and its resting contact, back contact and armature 218, conductor 15, working contact of spring 316 and said spring, conductor 333 and relay 409 to battery.

The relay 409 is energized to complete a circuit that extends from ground by way of front contact and armature 464, armature 444 and its front contact, back contact and armature 442, relay 419, armature 441 and its back contact, and front contact and armature 443 to battery.

The relay 419 is energized over the above-traced circuit and operates to open the circuit of the relay 420 at armature 463 and to establish a locking circuit for itself at the front contact of this armature, exclusive of the armature 464. The relay 420 is deenergized to complete the driving circuit.

The driving circuit now extends from ground by way of back contact and armature 452, line relay 412, front contact and armature 446, conductor 246, front contact and armature 244, conductor 245, back contact and armature 465, trunk conductor 470, armature 645 and its back contact, conductor 566, armature 843 and its front contact, conductor 567, armature 662 and its front contact, line relay 618, and armature 659 and its back contact to battery. The line relays 412 and 618 are energized over the above circuit.

The line relay 412, upon being energized, completes a circuit at armature 449 for the relay 414 and at armature 448 completes a circuit for the relay 402. The relay 414 operates to connect battery to one terminal of the winding of the relay 418 at armature 454, to open the locking circuits of the relays 416 and 417 at armature 466 and to prepare a circuit for the relay 413 at armature 453.

The relay 416 is deenergized to prepare a point in the circuit of the relays 415 and 615 at armature 459, to prepare a circuit for the relay 417 at armature 458 and to prepare an impulsing circuit at armature 457. The relay 417 is deenergized to open one point in the circuit of the relay 416 at armature 460 and to complete a circuit, at armature 467, over a path that extends from grounded conductor 11 by way of back contact and armature 467, armature 453 and its front contact, relays 413 and 414 to battery. This circuit is not effective to energize the relay 413 so long as the original energizing circuit for the relay 414 is maintained.

The relay 402, upon being energized, operates to prepare one point in its locking circuit at armature 427, to complete a circuit for the relay 405 at armature 426, to complete an impulsing circuit at armature 429, and to open the locking circuit of the relay 403 at armature 428. The relay 403 is deenergized to open the circuit of the relay 404 at armature 430, and to complete a locking circuit for the relay 402 at armature 431. The relay 404 is deenergized to prepare one point in the circuit of the relay 420. The relay 405 is energized to prepare another point in the circuit of the relay 420.

The previously mentioned impulsing circuit is now completed over a path that extends from ground by way of back contact and armature 450, armature 429 and its front contact, conductor 20, front contact and armature 138, armature 166 and its back contact, counting relay 123, back contact and armature 153, and back contact and armature 173 to battery.

The relay 123 is operated to open the circuit of the selecting relay 309 at armature 168 and to complete a circuit at the front contact of this armature over a path that extends from ground by way of armature 170 and its back contact, armature 168 and its front contact, relay 122, relay 123, back contact and armature 154, and back contact and armature 173 to battery. The counting relay 122 is short-circuited as long as the original energizing circuit of the relay 123 is maintained. The selecting relay 309 is deenergized to open certain points in the signaling circuits and causes the removal of ground from conductors 333 and 331.

The removal of ground from the conductor 333 causes the deenergization of the relay 409, whereby the circuit of the relay 419 is opened and this relay is deenergized to prepare another point in the circuit of the relay 420 at armature 463.

By the removal of ground from the conductor 331, the relay 407 is deenergized and a circuit is completed for the relay 420 over a path that extends from battery by way of armature 434 and its back contact, armature 436 and its front contact, armature 440 and its back contact, relay 420 and back contact and armature 463 to ground.

The relay 420 is energized to open the circuit of the line relay 412 at armature 465 and to prepare a testing circuit at the front contact of this armature. The relay 412 is deenergized after a short interval of time to remove the short-circuit from the winding of the relay 413 at armature 449. The relay 413 is immediately energized to open another point in the original energizing circuit of the relay 414 at armature 451, to open another point in the circuit of the line relay 412 at armature 452, and to open one point in the testing circuit at armature 468. Still another result of the operation of the relay 413 is that, at armature 450, the impulsing circuit is opened and the counting relay 122 is permitted to energize.

The relay 122 operates to prepare a circuit for the counting relay 109 at armature 165, to open another point in the original energizing circuit of the relay 123 at armature 166, and to complete a circuit at armature 167 over a path that extends from ground by way of armature 170 and its back contact, armature 137 and its back contact, armature 167 and its front contact, conductor 31 and selecting relay 308 to battery. The selecting relay 308 is energized to prepare certain signaling circuits at springs 325 and 326 and to place ground upon the conductor 330 at spring 312. The grounding of conductor 330 brings about the energization of the relay 406.

Another result of the operation of the relay 308 is that the lamp 319 is lighted, its circuit being completed at spring 314. This and other similar signals merely apprise the dispatcher of the position of the selecting apparatus at any given time.

The relay 406, upon being energized, opens one point in the circuit of the relay 420 at armature 438, and at armature 437 completes a circuit for the relay 401. The relay 401 is energized to open the locking circuit of the relay 400 at armature 425, and to prepare a locking circuit for itself at armature 424. The relay 400 is deenergized to open the circuit of the relay 411 at armature 423, and to complete a locking circuit for the relay 401 to ground upon grounded conductor 11 at armature 421. The relay 411 is deenergized to prepare one point in the circuit of the line relay 415 at armature 446, and to open the circuit of the buzzer 410 which ceases to operate.

As there is no signaling operation to be performed at this time, there will be ground present upon the conductor 326 for the reason that the conductor 326 extends to relay apparatus associated with the control keys, in the same manner that the conductor 15 extends thereto. Ground is only removed from conductors such as these when it is desired to perform some operation in the substation.

As a result of the presence of ground on the conductor 326, a circuit is completed over conductor 332 for the relay 408. The relay 408 is energized to complete a circuit at armatures 441 and 442 for the relay 419. This circuit may be traced from ground by way of front contact and armature 464, armature 444 and its back contact, front contact and armature 442, relay 419, armature 441 and its front contact and back contact and armature 443 to battery.

The relay 419 operates to open the circuit of the relay 420 at armature 463 and to establish a locking circuit for itself at the front contact of this armature. The relay 420 is deenergized to open one point in the original energizing circuit of the relay 419 at armature 464 and to prepare a point in the circuit of the line relay 415 at armature 465.

At the station, the line relay 618, upon being energized, completes a circuit for the relay 616 at armature 661, and at armature 660 completes a circuit for the relay 607. The relay 616, upon being energized, opens the circuit of the relays 613 and 614 at armature 666, prepares a circuit for the relay 617 at armature 655, and at armature 656 connects battery to one terminal of the relay 612.

The relay 614, upon being deenergized, prepares an impulsing circuit at armature 650, at armature 651 prepares a circuit for the relay 613, at armature 652 prepares one point in the circuit of the line relay 615, and at armature 690 prepares another point in the testing circuit. The relay 613, upon being deenergized, opens one point in the circuit of the relay 614 at armature 648, opens one point in the testing circuit at armature 649, and at armature 665 completes a circuit that extends from ground upon grounded conductor 564 by way of back contact and armature 665, armature 655 and its front contact, relay 617 and relay 616 to battery. The relay 617 is not energized so long as the original energizing circuit of the relay 616 is maintained.

The relay 607 is energized to complete a circuit for the relay 604 at armature 636, to prepare a locking circuit for itself at armature 689, to open the locking circuit of the relay 634 at armature 637 and to complete an impulsing circuit at armature 638. The relay 606 is deenergized to open the circuit of the relay 605 at armature 632, to open one point in the impulsing circuit at armature 635, and to complete a locking circuit for the relay 607 at armature 633. The relay 605 is deenergized to prepare one point in the circuit of the relay 610 at armature 631. The relay 604 is energized to prepare a point in the circuit of the relay 610 at armature 630.

The previously mentioned impulsing circuit may be traced from ground by way of back contact and armature 657, armature 638 and its front contact, conductor 560, front contact and armature 727, armature 744 and its back contact, counting relay 712, back contact and armature 755, and back contact and armature 758 to battery.

The counting relay 712 is energized over the circuit traced above and operates at armature 742 to open the circuit of the selecting relay 500, and to complete a circuit at the front contact of this armature that extends from ground by way of armature 761 and its back contact, armature 742 and its front contact, relay 713, relay 712, back contact and armature 755, and back contact and armature 758 to battery. This circuit is not effective so long as the original energizing circuit for the relay 712 is maintained by reason of the fact that it is short-circuited.

When the relay 500 is deenergized, certain signaling circuits are opened at springs 512 and 513, and at springs 514 and 515 ground is removed from conductors 544 and 546, respectively. The removal of ground from conductor 544 causes the circuit of the relay 600 to be opened. The relay 600 is deenergized to open the circuit of the relay 611 which is deenergized to prepare another point in the circuit of the relay 610. By the removal of ground from conductor 546, the circuit of the relay 602 is opened, and this relay is deenergized to complete the circuit of the relay 610 over a path that extends from battery by way of armature 631 and its back contact, armature 630 and its front contact, armature 626 and its back contact, relay 610 and back contact and armature 646 to battery.

When the relay 610 is operated, a circuit is prepared for the relay 611 at armature 644, at armature 645 the circuit of the slow-acting line relay 618 is opened, and at the front contact of this armature the testing circuit is completed. This testing circuit extends from battery by way of back contact and armature 668, armature 656 and its front contact, testing relay 612, front contact and armature 645, trunk conductor 470, armature 465 and its front contact, testing relay 418, front contact and armature 454, and armature 468 and its back contact to battery. This circuit is not effective to energize the testing relays 418 and 612 for the reason that the batteries oppose each other.

The testing circuit is only completed during the time that the slow-acting line relays 618 and 412 are maintained energized. In the event that the relay chains at the dispatcher's office and substation are not in synchronism, the testing relays 418 and 612 are energized. This follows because, if the line relay 415 at the dispatcher's office is energized, ground is connected to the test circuit. At the substation, battery will be connected to the test circuit, inasmuch as it has been assumed that the relay apparatus is out of step. Under these conditions, the relays 418 and 612 energize.

The relay 418 is operated to place ground at 462 upon the conductor 12, thereby bringing about the energization of the slow-acting relay 124. The energization of the relay 124 brings about the release of the apparatus at the dispatcher's office in a manner which will appear later.

The relay 612, at the substation, upon being energized, places ground upon the conductor 563 at armature 647, thereby completing the circuit for the slow-acting relay 725. The relay 725 is energized to bring about the release of the relay selecting apparatus at the substation in a manner which will appear hereinafter.

This same result, of course, follows if ground is connected to the test circuit at the substation and battery is connected to the test circuit at the dispatcher's office. This only occurs when the selecting circuits are out of step. Otherwise, ground and battery will be connected to the test circuit at either end simultaneously.

Returning now to the operation of the selecting apparatus, the slow-acting line relay 618 is deenergized after an interval of time to remove the short-circuit from the relay 617. The relay 617 is operated to open another point in the circuit of the line relay 618 at armature 659, to open the previously mentioned test circuit at armature 668, to open another point in the original energizing circuit of the relay 616, at armature 658, and to open the impulsing circuit at armature 657. By the latter operation, the short-circuit is removed from the counting relay 713 and this relay is energized.

Upon operating, the relay 713, at armature 743, prepares a circuit for the counting relay 702, opens another point in the original energizing circuit of the relay 712 at armature 744, and at armature 745 completes a circuit which extends from ground by way of armature 761 and its back contact, armature 730 and its back contact, armature 745 and its front contact, conductor 542 and selecting relay 501 to battery. The selecting relay 501 is energized to complete certain signaling circuits and to place ground upon the conductors 545 and 547 at springs 516 and 517.

By the grounding of conductor 545, a circuit is completed for the relay 601. By the grounding of conductor 547, a circuit is completed for the relay 603. The relay 603 operates to open a point in the circuit of the relay 610 at armature 628 and to complete a circuit for the relay 608 at armature 627. The relay 608 is operated to open the locking circuit of the relay 609 at armature 640 and to prepare a locking circuit for itself at armature 639. The relay 609 is deenergized to open the circuit of the relay 619 at armature 643 and to complete the locking circuit of the relay 608 at armature 641.

By the operation of the relay 601, a circuit is completed that extends from ground by way of front contact and armature 644, armature 622 and its back contact, front contact and armature 624, relay 611, armature 623 and its front contact, and back contact and armature 621 to battery. The relay 611 is operated to establish a locking circuit for itself at armature 646 and to open the circuit of the relay 610 at the same armature. The relay 610 is deenergized to open one point in the original energizing circuit of the relay 611 at armature 644, and to prepare a circuit for the line relay 615. The relay 619 is deenergized to prepare a circuit for the line relay 615 at armature 662.

Provided the signaling operations have occurred in the manner before described, or that no signaling operation has been sent, the driving circuit will now be completed.

At the dispatcher's office, the line relays 415 and 412 are alternately connected to the driving circuit and operated to cause the energization of the counting relays 109, 108, 121, 120, 107, 106, 119, 118, 105, 104, 117, 116, 103, 102, 115, 114, 101, 100, 113 and 112 in the sequence mentioned. The operation of these counting relays causes the energization of the selecting relays 307, 306, 305, 304, 303, 302, 301 and 300, and also the operation of the relays 311 and 310 in the usual manner. The operation of the selecting relays brings about the closure of the signaling circuits and the operation of the relays 406, 407, 408 and 409 so as to control the connection of the line relays 412 and 415 to the driving circuit. The operation of the relays 311 and 310 merely places ground upon the conductors 330 and 332 and 331 and 333, respectively, so as to cause proper operation of the relays 406 to 409, inclusive.

At the substation, by the operation of the driving circuit, the line relays 615 and 618 are alternately operated to bring about the operation of the counting relays 702, 703, 714, 715, 704, 705, 716, 717, 706, 707, 718, 719, 720, 721, 710, 711, 722 and 723 in the usual manner, in the sequence set forth. The counting relays bring about the operation of the selecting relays 502 to 509, inclusive, and also the operation of the relays 510 and 511, in the proper sequence. By the operation of the selecting relays, signaling circuits are closed in the same manner as before and, in addition, the relays 600, 601, 602 and 603 are operated to cause the proper connection of the line relays 615 and 618 to the driving circuit. The relays 510 and 511 merely operate to place ground upon conductors 545 and 547 and 544 and 546, respectively, so as to control the operation of the relays 600 to 603, inclusive. Of course, the synchronous operation of the relay selecting groups is checked at each step by the closure of the test circuit.

When the counting relay 113 at the dispatcher's office is operated by the energization of the line relay 412, the circuit of the relay 311 is opened and this relay is deenergized to remove ground from the conductors 331 and 333. By the removal of ground from conductor 331, the relay 407 is deenergized, while by the removal of ground from conductor 333, the relay 409 is deenergized.

By the latter operation, the circuit of the relay 419 is opened and this relay is deenergized to cause the operation of the relay 420.

The relay 420 operates to open line 245 and to complete the testing circuit. After a short interval of time, the line relay 412 is deenergized to permit the operation of the relay 413. The relay 413 is operated to open the testing circuit, thereby removing the short-circuit from the counting relay 112. The counting relay 112 is operated to remove the short-circuit from the slow-acting relay 125 at armature 153, to open another point in the original energizing circuit of the relay 113 at armature 154, and at armature 155 to complete a circuit for the relay 310. The relay 310 is energized to place ground upon the conductors 330 and 332.

The grounding of conductor 330 brings about the operation of the relay 406. The relay 406 is energized to open one point in the circuit of the relay 420 and to close a circuit for the relay 401. The relay 401 operates to open the locking circuit of the relay 400 and to establish a locking circuit for itself. The relay 400 is deenergized to open the circuit of the relay 411. The relay 411 retracts its armature to prepare a circuit for the line relay 415.

The relay 408 is energized to complete a circuit for the relay 419. The relay 419 is operated to open the circuit of the relay 420. The relay 420 is deenergized to prepare one point in the circuit of the relay 415.

The slow-acting relay 125 is energized to complete a circuit for the slow-acting relay 124 at armature 174. The relay 124 operates to open the circuit of the relay 310 at armature 169 and to open the circuits of all the counting relays 100 to 123, inclusive, and the relay 125 at armature 170. The counting relays 100 to 123, inclusive, are thereupon restored to normal, as is the relay 125. The deenergization of the relay 310 brings about the deenergization of the relays 406 and 408. The deenergization of the relay 408 brings about the deenergization of the relay 419.

Other results of the operation of the relay 124 are that ground is removed from the conductor 11 and placed upon the conductor 10 at armature 171, and ground is momentarily connected to the conductor 13 at armature 172. The removal of ground from conductor 11 causes the deenergization of the relay 401 and the relay 402. The relay 402 is deenergized to open the circuit of the relay 405. The relay 405 is deenergized to open one point in the circuit of the relay 420.

By the grounding of conductor 10, a circuit is closed for the relay 205. The relay 205 is energized to open the circuit of the relay 207 at armature 229, to establish a locking circuit for itself at armature 228, and to open one point in the circuit of the relay 213 at armature 227. The relay 213 is not deenergized until after the deenergization of the slow-acting relay 125. In this manner, all apparatus at the dispatcher's office is restored to normal.

At the substation, the counting relay 722 is operated by the energization of the line relay 618. The relay 722 opens the circuit of the relay 510 and completes a circuit for the relay 723. The relay 510 is deenergized to remove ground from the conductors 545 and 547.

The removal of ground from conductor 545 opens the circuit of the relay 601 that is deenergized to open the circuit of the relay 611. The removal of ground from conductor 547 brings about the deenergization of the relay 603.

By the deenergization of the relay 611, a circuit is completed for the relay 610. The relay 610 is energized to close the testing circuit and to open the circuit of the relay 618. If the testing circuit does not operate, the relay 618 is deenergized after an interval of time to permit the operation of the relay 617. The relay 617 is operated to open the testing circuit and to remove the short-circuit from the relay 723. The relay 723, upon operating, removes the short-circuit from the slow-acting relay 724 at armature 755, opens another point in the circuit of the relay 722 at armature 756, and at armature 757 completes a circuit for the relay 511. The relay 511 is operated to place ground upon the conductors 547 and 545.

By the grounding of the conductor 545, the relay 601 is operated to close the circuit of the relay 611. The relay 611 is energized to open the circuit of the relay 610. The relay 610 is deenergized to prepare a circuit for the line relay 615. The relay 603 is operated to complete a circuit for the relay 608. The relay 608 is operated to open the circuit of the relay 609. The relay 609 is deenergized to open the circuit of the relay 619. The relay 619 retracts its armature to prepare a circuit for the line relay 615.

By the operation of the relay 724, a circuit is completed for the relay 725 at armature 759. The slow-acting relay 725 is energized to open the circuit of the relay 510 at armature 760, to open the circuit of the counting relays 700 to 723, inclusive, and relay 724 at armature 761, to remove ground from conductor 564 and place ground upon conductor 565 at armature 762, and to place ground upon the conductor 752 at armature 763. The counting relays are deenergized to restore certain circuits to normal.

The removal of ground from conductor 564 brings about the deenergization of the relays 613 and 614 and 608 and 606. The release of the relay 606 opens the circuit of the relay 605. The relay 510 is deenergized to remove ground from the conductors 545 and 547, thereby permitting the relays 601 and 603 to be deenergized. By the deenergization of the relay 601, the circuit of the relay 611 is opened.

By the grounding of conductor 565, a circuit is completed for the relay 820. The relay 820 operates to open the circuit of the relays 817 and 818 at armature 859, to open the circuit of the relay 812 at armature 860, and to establish a locking circuit for itself at armature 858. The relays 817 and 812 are deenergized to prepare a circuit for the holding relay 816.

The relay 724 is deenergized to open the circuit of the relay 812 and also the circuit of the relay 725. The relay 725 is deenergized to restore certain circuits to normal, while the relay 812 is deenergized to prepare a holding circuit. This circuit now extends from ground by way of back contact and armature 233, holding relay 209, back contact and armature 244, conductor 245, back contact and armature 465, trunk conductor 470, armature 645 and its back contact, conductor 566, armature 843 and its back contact, holding relay 816, and armature 853 and its back contact to battery. The holding relays 209 and 816 are energized over this circuit.

The relay 209 is operated to complete a circuit for the relay 206 at armature 235, and to prepare a circuit for the relay 212 at armature 234. The relay 206 is energized to open the locking circuit of the relay 205. The relay 205 is deenergized to prepare a circuit for the relay 208 at armature 229, and to complete a circuit, at armature 227, which extends from ground by way of back contact and armature 227, armature 234 and its front contact, and relay 212 to battery. The relay 212 is energized to connect the Wheatstone bridge testing circuit to the signaling conductors 17 and 18.

At the substation, the holding relay 816 is energized to complete a circuit for the relay 819 at armature 850, and to prepare a circuit for the relay 802 at armature 851. The relay 819 is operated to prepare a circuit for the starting relay 818 at armature 856 and to open the locking circuit of the relay 820 at armature 857. The relay 820 is deenergized to prepare a circuit for the relay 817 at armature 859, and to complete a circuit, at armature 860, over a path that extends from ground by way of back contact and said armature, armature 851 and its front contact, and relay 802 to battery. The relay 802 is energized to connect the relay 804 across the conductors 17 and 18, thus completing the Wheatstone bridge testing circuit for the signaling conductors. The relay 804 is immediately energized in order that the circuit of the buzzer 801 is not completed.

The above is the normal operation of the system. However, it is possible that the mechanical construction of the selecting relays may cause trouble. That is, these relays may not restore to normal promptly upon the respective circuits being opened. In order to prevent false operation of the system under these conditions, certain provisions have been made. It will be seen that, whenever a selecting relay, such as selecting relay 309, is energized, there is a circuit completed for the relay 407. The relay 407 completes a circuit for the relay 400 at armature 439, and opens one point in the circuit of the relay 420.

Now, if the relay 309 should remain operated, even after its energizing circuit is opened, when the relay 308 is operated, there will be a circuit completed for the relay 406. The relay 406 is energized to open another point in the circuit of the relay 420. The circuit of the relay 420 is thus opened at armatures 438 and 440 so that no circuit can be completed for it.

One of the results of the operation of the relay 407, which is maintained energized by the relay 309, is to complete a circuit for the relay 400. The relay 400 maintains the relay 411 energized so that the line relay 412 may be permanently connected to the driving circuit under these conditions. Consequently, even though the selecting apparatus at the substation functions properly and switches over to connect the line relay 615 to the driving circuit, the relay 412 at the dispatcher's office will be deenergized. This operation merely serves to bring about the energization of the relay 122 in a manner before described, and also the operation of the selecting relay 308.

As the relays 406 and 407 are energized, the relay 420 cannot be energized and, as the line relay 412 is permanently connected to the driving circuit under these conditions, there will be no further operation of the driving circuit and the attention of the dispatcher will be called to the defect so that it may be remedied. The same operation occurs in the event that one of the selecting relays at the substation remains operated after its circuit is opened.

It will be recalled that, when the circuit breaker C is operated by the dispatcher, the relay 813 is locked energized. Now, when the relay 819 is energized, a circuit is completed for the relay 818. The relay 818 completes a circuit for the relay 817 and also a circuit that extends from ground by way of armature 855 and its front contact, relay 815, front contact and armature 848, and armature 844 and its back contact to battery. The relay 815 is operated to open the circuits of the relays 813 and 814.

By the deenergization of the relay 813, the relay 817 is permitted to operate, while, by the deenergization of the relay 814, the circuit of the relay 815 is opened and this relay is energized. By the operation of the relay 817, the holding circuit, including the holding relays 209 and 816, is opened and the relays mentioned are deenergized. The deenergization of these relays initiates the operation of the driving circuit in the same manner as before described.

It will be seen that, each time the relay 411 at the dispatcher's office operates, there will be a circuit completed for the buzzer 410 so that the dispatcher will be informed that the line relay 412 is the one that is connected to the driving circuit. This provision makes it easier for trouble in the circuit to be traced.

It will be remembered that, in case the selecting apparatus at the dispatcher's office and at the station becomes out of step for any reason, the slow-acting relays 124 and 725 are operated. This action, of course, releases the circuit in the manner above described. The apparatus does not function until the dispatcher operates his starting key K—1. This provision is made in order to enable the dispatcher to ascertain what is causing the apparatus to get out of synchronism before again initiating its operation.

If a circuit breaker, such as that disclosed in Fig. 8, is automatically operated, the driving circuit is started into operation, and the relay chain functions to synchronously operate the selector relays in exactly the same manner as that described in a control operation. In order to make the operation more clear, a description will be given of the operations which take place when the circuit breaker shown is automatically operated from the open position to the closed position. As described in connection with the control operation, the relay 816 is normally energized over the drive line with the system in an inoperative condition. Upon the operation of the circuit to its closed position, a circuit is completed from ground, through the upper contacts of the pallet switch, armature 832 and its front contact, armature 856 and its front contact, winding of relay 818 and battery, to ground. Relay 818 is energized over this circuit and prepares a series locking circuit for itself and relay 817 over armatures 854 and 859 but this circuit is not effected at this time, due to the fact that the original energizing circuit for the relay 818 shunts winding of relay 817.

A further result of the operation of the circuit breaker is to open the energizing circuit for the slow-release relay 805. After an interval of time, this relay becomes deenergized and permits its armatures to drop to their back positions. As soon as the armature 832 leaves its front contact, the original energizing circuit for the relay 818 is opened, and the series locking circuit for the relays 818 and 817 becomes effective. The energization of the relay 817 opens the normal start circuit at armature 853, and the relays 816 at the substation office and 209 at the dispatcher's office become de-energized.

From here on, the operation is exactly the same as described in connection with the control operation. The selecting relays at the two stations are operated in synchronism until the selecting relay associated with the circuit breaker is operated to connect said circuit breaker to the supervisory line. A supervisory signal will now be transmitted over the supervisory line from ground over the back contact and armature 835 and from there on as described earlier in the specification.

Our invention is not limited to the particular arrangement of the apparatus illustrated, but may be variously modified without departing from the spirit and scope of our invenion, as set forth in the appended claims.

We claim as our invention:

1. In a signaling system, the combination with a dispatcher's office, and a station, of a group of relays at the dispatcher's office, a group of relays at the station, means for operating the relays in the group at the office in a predetermined sequence and means for operating the relays in the group at the station in synchronism therewith, releasing means for restoring the relays in the group at the office to normal in a predetermined sequence, and means operative in the event that one of said relays fails to restore to normal for interrupting the sequential operation of the relays in the group at said office.

2. In a signaling system, the combination with a dispatcher's office and a station, of a group of relays at the dispatcher's office, a group of relays at the station, means for operating the relays in the group at the office in a predetermined sequence, and means for operating the relays in the group at the station in synchronism therewith, releasing means for restoring the relays in the group at the office to normal in a predetermined sequence, and means operative in the event that one of said relays fails to restore to normal for preventing the sequential operation of the relays in the group at said station.

3. In a signaling system, the combination with a dispatcher's office, a station, a group of relays at the dispatcher's office and a group of relays at the station, of a driving circuit at the office and the station, means controlled by the driving circuit for operating the relays in the group at the office in a predetermined sequence, means controlled by the driving circuit for operating the relays in the group at the station in synchronism with the relays in the group at the office, means for releasing the relays in the group at the office in a predetermined sequence, and means operative if one of said relays fails to restore to interrupt the operation of the driving circuit.

4. In a signaling system, the combination with a dispatcher's office, a station, a group of relays at the office and a group of relays at the station, of a driving circuit at the office and the station, means controlled by the driving circuit for operating the relays in the group at the office in a predetermined sequence, means controlled by the driving circuit for operating the relays in the group at the station in synchronism with the relays in the group at the office, means for releasing the relays in the group at the station in a predetermined sequence, and means operative if one of said relays fails to restore to interrupt the operation of the driving circuit.

5. In a signaling system, the combination with a dispatcher's office, a station, a group of relays at the office, a group of relays at the station, and apparatus units in the office and the station, of means including a driving circuit at the office and the station for operating the relays in each group in synchronism, means controlled by the operation of the relays for selecting predetermined apparatus units, means for releasing the relays in each group in a predetermined sequence, and means for preventing further operation of the selecting relays in the event that one of the relays in the group at the office does not restore to normal.

6. In a signaling system, the combination with a dispatcher's office, a station, a group of relays at the office, a group of relays at the station, and apparatus units in the office and the station, of means including a driving circuit at the office and the station for operating the relays in each group in synchronism, means controlled by the operation of the relays for selecting predetermined apparatus units, means for releasing the relays in each group in a predetermined sequence, and means for preventing further operation of the selecting relays in the event that one of the relays in the group at the station does not restore to normal.

7. In a signaling system, the combination with a dispatcher's office, a station, a group of relays at the office, a group of relays at the station, and apparatus units in the office and the station, of means including a driving circuit at the office and the station for operating the relays in each group in synchronism, means controlled by the operation of the relays for selecting predetermined apparatus units, means for releasing the relays in each group in a predetermined sequence, and means for preventing further operation of the selecting relays in the event that one of the relays in the group at either station does not restore to normal.

8. In a signaling system, the combination with a dispatcher's office, a station, a group of relays at the office and a group of relays at the station, of a driving circuit comprising a pair of line relays at the office and a pair of line relays at the station, means controlled by the line relays for causing the operation of the relays in each group in a predetermined sequence, means operative to cause the driving circuit to alternately operate the line relays, a signaling device, and means for operating the signaling device whenever a predetermined one of the line relays is connected to the driving circuit.

9. In a signaling system, a first station, a second station, a selector at each of said stations, a drive circuit connecting said stations, means including said drive circuit for operating said selectors in synchronism, and means including said drive circuit for intermittently checking the position of said selectors.

10. In a signaling system, a first station, a second station, a selector at each of said stations, a drive circuit connecting said stations, means including said drive circuit for operating said selectors in synchronism, means including said drive circuit for intermittently checking said selectors, and means operative if said check indicates the selectors to be out of synchronism for bringing said selectors into synchronism.

11. In a signaling system, a first station, a second station, a selector at each of said stations, a drive line connecting said stations, means controlled by said selectors for periodically transmitting impulses over said drive line, means responsive to said impulses over said drive line for operating said selectors in synchronism, means operative in between the transmission of said impulses over said drive line for switching said drive line to a check position and means operative while said drive line is on said check position for checking the synchronism of said selectors.

12. In a signaling system, a first station, a second station, selectors at each of said stations, a drive line connecting said stations, and means including said drive line for alternately operating said selectors in synchronism and checking the synchronism of said selectors.

13. In a signaling system, a first station, a second station, selectors at each of said stations, a drive line connecting said stations, means including said drive line for operating said selectors in synchronism and means including said drive line operating alternately with said first-mentioned means for checking the synchronism of said selectors.

14. In a signaling system, a first station, a second station, selectors at each of said stations, a drive line connecting said stations, means controlled by said selectors for transmitting impulses over said drive line, means responsive to said impulses for operating said selectors in synchronism and means including said drive line for checking the synchronism of said selectors.

15. In a signaling system, a first station, a second station, selectors at each of said stations, a drive line connecting said stations, a battery at each of said stations, means including said selectors for associating said drive line with alternate sides of said battery, the drive line being arranged to be associated with the positive side of battery at one station and simultaneously associated with the negative side of the battery at the other station when said selectors are in synchronism, means responsive to the impulse transmitted over said drive line for operating said selectors in synchronism, means responsive to the operation of said selectors for switching said drive line to a check position and means including said drive line for checking the synchronism of said selectors.

16. In a signaling system, a first station, a second station, selectors having a plurality of selecting points at each of said stations, a drive line connecting said stations, a first driving means at each station associated with the alternate odd numbered selecting point of said selectors at its station, a second driving means at each station associated with all the even numbered selecting point of said selectors at its stations, means for connecting said first driving means at each of said stations with said drive line, means including said first driving means at each of said stations for operating an odd numbered selector at each of said stations, means responsive to the operation of said selectors at each of said stations for switching said drive line to the even driving means at each of said stations, and means including said driving means at each of said stations and said drive line for checking said synchronism periodically.

17. In a signaling system, a first station, a second station, selectors at each of said stations, each of said selectors having a plurality of selecting positions, a drive line connecting said stations, a first electromagnetic means at each station associated with the alternate odd numbered selecting positions of said selectors, a second electromagnetic means at each station associated with all the even numbered selecting positions of said selectors, means for connecting said first electromagnetic means at each of said stations with said drive line, means including said first electromagnetic means at each of said stations for operating an odd numbered selector at each of said stations, means responsive to the operation of said selectors at each of said stations for switching said drive line to be connected with the even numbered electromagnetic means at each of said stations, and means including said electromagnetic means at each of said stations and said drive line for checking said synchronism periodically.

18. In a signaling system, a first station, a second station, a relay chain selector at each of said stations, a drive circuit connecting said stations, means including said drive circuit for operating said relay chain selectors in synchronism and means including said drive circuit for intermittently checking the position of said relay chain selectors.

19. In a signaling system, a first station, a second station, relay chain selectors at each of said stations, a drive line connecting said stations, and means including said drive line for alternately operating said relay chain selectors in synchronism and checking the synchronism of said selectors.

20. In a signaling system, a first station, a second station, relay chain selectors having a plurality of selecting points at each of said stations, a drive line connecting said stations, a first driving means at each station associated with the alternate odd numbered selecting point of said relay chain selectors at its station, a second driving means at each station associated with all the even numbered selecting points of said relay chain selectors at its station, means for connecting said first driving means at each of said stations with said drive line, means including said first driving means at each of said stations for operating an odd numbered selector at each of said stations, means responsive to the operation of said selectors at each of said stations for switching said drive line to the even driving means at each of said stations, and means including said driving means at each of said stations and said drive line for checking said synchronism periodically.

21. In a signaling system, a first station, a second station, relay chain selectors at each of said stations, each of said selectors having a plurality of selecting positions, a drive line connecting said stations, a first electromagnetic means at each station associated with the alternate odd numbered selecting positions of said selectors, a second electromagnetic means at each station associated with all the even numbered selecting positions of said relay chain selectors, means for connecting said first electromagnetic means at each of said stations with said drive line, means including said first electromagnetic means at each of said stations for operating an odd numbered selector at each of said stations, means responsive to the operation of said relay chain selectors at each of said stations for switching said drive line to be connected with the even numbered electromagnetic means at each of said stations, and means including said electromagnetic means at each of said stations and said drive line for checking said synchronism periodically.

22. In a signaling system, a first station, a remote station, a relay chain at each station, a drive line connecting said relay chains, means for transmitting impulses over said drive line, means responsive to said impulses for operating said relay chains in synchronism and means operative following each of said drive impulses and including said drive line for determining whether said relay chains have operated correctly in accordance with the preceding drive impulse.

23. In a signaling system, a first selector, a remote selector, a drive line connecting said selectors, said drive line having an alternate connection, means for transmitting impulses over said drive line, means responsive to said impulses for operating said selectors in synchronism, means operative following said impulses for switching said drive line to its alternate connection for determining whether said selectors have operated correctly in accordance with the preceding drive impulse.

24. In a signaling system, a first station, a remote station, relay chains at each of said stations, a drive line connecting said relay chains, means for transmitting impulses over said drive line, means responsive to said impulses for operating said relay chains in synchronism, relay means controlled by said relay chains in accordance with the condition thereof, means following the transmission of said drive impulses for switching said drive line to said relay means and means including said drive line and said relay means for determining whether said relay chains have operated correctly in accordance with the preceding drive impulse.

25. In a signaling system, a first station, a remote station, a selector at each station, a drive line connecting said selectors, means for transmitting impulses over said drive line, means responsive to said impulses for operating said selectors in synchronism and means operative following each of said drive impulses and including said drive line for determining whether said selectors have operated correctly in accordance with the preceding drive impulse.

26. In a signaling system, a first station, a remote station, selectors at each of said stations, a drive line connecting said selectors, means for transmitting impulses over said drive line, means responsive to said impulses for operating said selectors in synchronism, relay means controlled by said selectors in accordance with the condition thereof, means following the transmission of said drive impulses for switching said drive line to said relay means and means including said drive line and said relay means for determining whether said selectors have operated correctly in accordance with the preceding drive impulse.

In testimony whereof, we have hereunto subscribed our names this 11th day of November, 1924.

THOMAS U. WHITE.
JOHN E. GARDNER.